United States Patent [19]

Lehnhardt

[11] 4,244,228
[45] Jan. 13, 1981

[54] PRESSURE TRANSDUCER

[75] Inventor: Lutz Lehnhardt, Berlin, Fed. Rep. of Germany

[73] Assignee: Siemens Aktiengesellschaft, Munich, Fed. Rep. of Germany

[21] Appl. No.: 43,216

[22] Filed: May 29, 1979

[30] Foreign Application Priority Data

Jun. 6, 1978 [DE] Fed. Rep. of Germany ....... 2825222

[51] Int. Cl.³ ...................... G01L 13/02; G01L 13/06
[52] U.S. Cl. ........................................ 73/716; 73/718
[58] Field of Search ................ 73/706, 715, 716, 717, 73/718, 719, 720, 721, 722, 724; 361/283

[56] References Cited

U.S. PATENT DOCUMENTS

| 2,627,750 | 2/1953 | Titus | 73/729 |
| 3,534,612 | 10/1970 | Buckland | 73/722 |
| 3,747,042 | 7/1973 | Sheldon | 73/722 |
| 4,161,887 | 7/1979 | Stone et al. | 73/706 |

FOREIGN PATENT DOCUMENTS 2842474  4/1979  Fed. Rep. of Germany ............. 73/720

Primary Examiner—Donald O. Woodiel
Attorney, Agent, or Firm—Kenyon & Kenyon

[57] ABSTRACT

A pressure transducer, having a measuring element contained in a housing, is acted upon by the pressure to be measured and, due to its elastic properties, also acts as the measuring spring. A measuring transducer presenting no problems as to overload protection, having only small error, and useful with almost any pickup, includes a pressure sensing element consisting of two disc-shaped parts which are tightly joined together, facing each other, so as to form an inside cavity. One of the disc-shaped parts has a central cutout and is connected at the cutout to the housing. An opening in the housing in the vicinity of the central opening leads into the inside cavity. A transmission element is attached centrally to the other disc-shaped parts. The invention can be used in pressure and pressure difference transducers.

4 Claims, 4 Drawing Figures

PRESSURE TRANSDUCER

BACKGROUND OF THE INVENTION

This invention relates to a pressure transducer having a measuring element arranged in a housing which is acted upon by the pressure to be measured, and, due to its elastic properties, also acts as a measuring spring.

Discussion of the Prior Art

In one known pressure transducer of this type (Publication PDS 2110 G of the firm Rosemount), the measuring element consists of a diaphragm which is clamped in the housing at its outer circumference. This measuring diaphragm is part of a differential capacitor having two fixed capacitor plates, each formed of a suitably shaped insulating elements having a metal layer. The housing of the known pressure transducer is closed off from the outside of separating diaphragms, and the pressure is transmitted to the measuring diaphragm by means of an opening in the housing. When pressure is admitted, the measuring diaphragm is deflected, which results in a change of the capacitance since this diaphragm acts as a movable capacitor plate. The change of the capacitance is evaluated and represents a measure of the prevailing pressure.

It is an object of the invention to provide a pressure transducer which presents no problems as far as overload protection is concerned, which has small error due to static pressure change, and which can be used with almost any kind of pick up.

SUMMARY OF THE INVENTION

To solve this problem, the measuring element in a pressure transducer of the type described above employs, according to the invention, two disc-shaped parts which are arranged side by side and are connected tightly to each other at their outer circumference, forming a cavity inside. One disc-shaped part has a central cutout and is fastened, at the cutout, to the housing in the vicinity of the central opening. The opening in the housing leads into the inside of the cavity, and a transmission element is centrally attached therein to the other disc-shaped part.

It is a particular advantage of the pressure transducer according to the invention that an accurately machined base (bed) for the measuring element is not necessary to ensure overload protection, because, in this measuring transducer, the two disc-shaped parts come to rest on each other when the pressure load is excessive, eliminating the inside cavity. Protection against overload is thereby provided. A further advantage of this pressure transducer is that it can be combined with any kind of pickup element. Thus, for instance, the movable core of a differential transformer can be connected to the transmission element; or it is possible to connect the movable plate of a differential capacitor to it. Also, the transmission element of the pressure transducer of the invention can be connected to a feedthrough arrangement such as is described in German Offenlegungschrift No. 23 11 733. It should be noted that the pressure transducer need not be equipped with two separate diaphragms because the outside of its measuring element can be exposed directly to the medium whose pressure is to be determined without detrimental effects on the resulting measurement.

In the pressure transducer, both disc-shaped parts need not be made of spring material. However, for design and production reasons, it is advantageous if both disc-shaped parts are made of spring material. It has also been found to be advantageous when both disc-shaped parts are made like cup springs.

The two disc-shaped parts can be joined together tightly at their outer circumference in different ways. For production reasons and to insure particularly reliable operation, however, it has been found advantageous to enclose the two disc-shaped parts by a ring at their outer circumference and to connect them firmly to the ring on their outward facing edges. Advantageously, this ring is made of metal and is welded to the disc-shaped parts at the outside edges mentioned.

In a preferred embodiment of the pressure transducer, fabricated according to the teachings of the invention, the opening in the housing leading to the cavity between the disc-shaped parts is designed as a channel which runs at a right angle to the disc-shaped parts and in which the transmission element is arranged. One end of the transmission element is attached to the outer disc-shaped part and the end away from the disc-shaped parts is connected to a pick-up device. In this case, the positive side of the pressure transducer is connected to the space outside of the measuring element, while the negative side is in communication with the cavity inside of the measuring element.

A particularly advantageous, simple, design results when the inner end of the transmission element is attached on the outside of the closed disc-shaped part and the free end is attached to a pickup device. In that case, the positive side of the pressure transducer is then connected to the inside cavity via the opening leading into the inside cavity of the housing, while the outside of the measuring element is in communication with the negative side.

To obtain a design of the pressure transducer which is very sensitive also at very high pressures, it is advantageous, according to the invention, to arrange several measuring elements in series. In this case, both disc-shaped parts of one measuring element are provided with central cut-outs and the edges of the cut-outs of adjoining discs of adjacent elements are coupled by a connecting element which extends into adjoining central openings. The transmission element is then attached to the closed disc-shaped part of the second measuring element. In the same way, further additional measuring elements can be connected to each other if required. This feature of the invention has the advantage that use of a single measuring element having a very large spring constant is avoided and so provides for conversion of the pressure to be measured into large travel distances, giving useful mechanical advantage.

DETAILED DESCRIPTION OF THE DRAWINGS

DETAILED DESCRIPTION OF THE INVENTION

Figure 1:
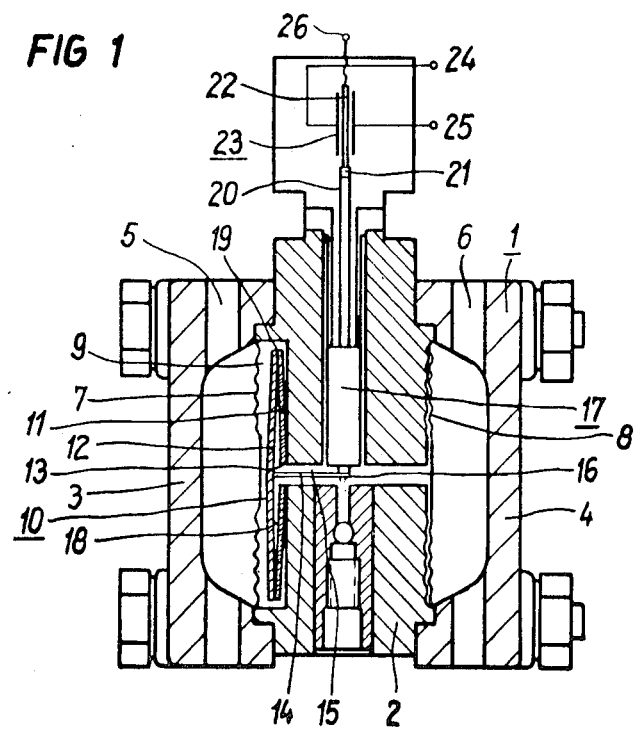
FIG. 1 is a view, in partial cross-section, of a pressure transducer according to the invention.

The embodiment of the invention depicted in FIG. 1 shows a pressure transducer 1, which has a housing 2 and pressure caps 3 and 4 connected to housing 2 by screws. The pressure caps 3 and 4 contain through-holes 5 and 6 for feeding in the pressure.

Each side of housing 2 is provided with a separation diaphragm 7 and 8, respectively. A measuring element 10 is located in a space 9 in housing 2 which consists of two disc-shaped parts 11 and 12. One disc-shaped part 11 has a central cutout 13 and is connected in the vicinity of this central opening to housing 2. The other disc-shaped part 12 is connected on its inside to transmission element 14 which protrudes through both central cutout 13 and a further opening 15 into the center of housing 2. The end 16 of transmission element 14 facing away from disc-shaped part 12 is mechanically connected to a pickup device 17.

The two disc-shaped parts 11 and 12 are arranged side-by-side, as can be seen in FIG. 1, and form an inside cavity 18, which is closed off from the outside by connecting the two disc-shaped parts 11 and 12 tightly to each other at their outer circumference. Inside cavity 18 of the measuring element is therefore sealed off completely from the surrounding space in the measuring element and is in communication with the negative side of the pressure transducer via opening 15 which is designed as a conduit or channel. The outside of measuring element 10, on the other hand, is exposed to the pressure on the positive side.

Due to a pressure difference between the positive side and the negative side of pressure transducer 1, the two-disc shaped parts 11 and 12 of the measuring element 10 are more or less compressed and the transmission element 14 is displaced. The displacement of transmission element 14 tilts rod 20 of pickup device 17 at its upper end 21, whereby the position of center plate 22 of differential capacitor 23 is changed. By placing an AC voltage across the terminals 24 and 25, a measurement variable can then be taken off at an output terminal 26 in a manner well known in the art. This variable corresponds to the displacement of transmission element 14 and the prevailing pressure or pressure difference, since the displacement is proportional to the pressure or the pressure difference.

Figure 2:
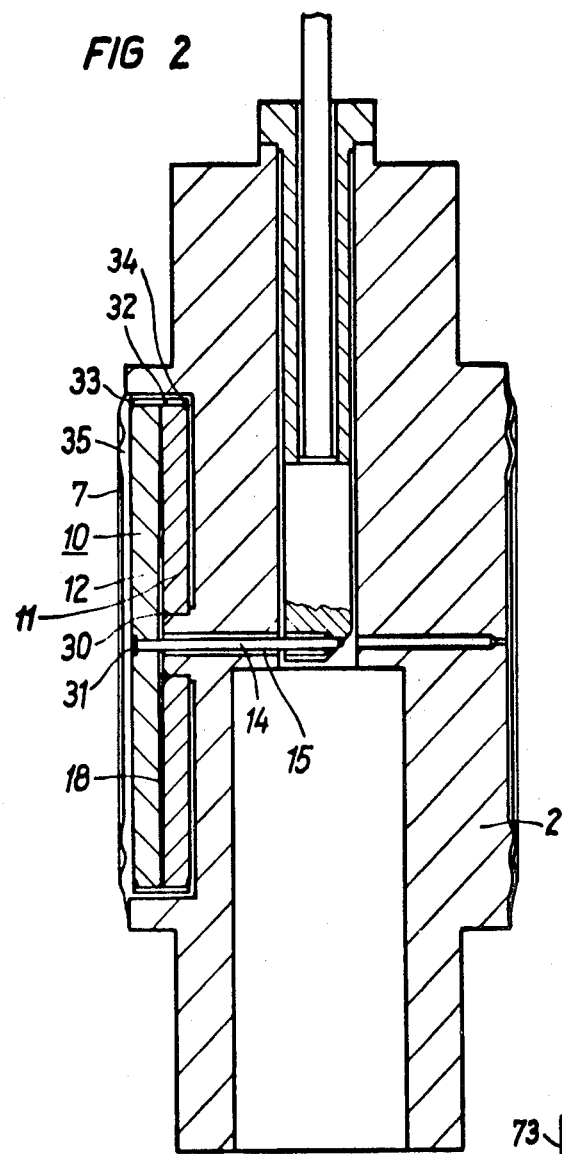
FIG. 2 is an enlarged view, in cross-section, of the housing of FIG. 1, showing a measuring element.

The enlarged presentation of housing 2 of FIG. 2 shows inner disc-shaped part 11 as welded to housing 2 all around its inner edge 30. Transmission element 14 is fitted through a hole in disc 12 and is welded on the outer surface of the disc 12 at the point 31. In a preferred embodiment of the invention, the outer circumferences of both disc-shaped parts 11 and 12 are circumscribed by a metallic ring 32, which is welded to their respective outer edges 33 and 34. In this manner, the space between the separation diaphragm 7 and the housing 2, i.e., the space 35 outside of measuring element 10, is sealed off from inside cavity 18 formed by the two disc-shaped parts 11 and 12, which are preferably made as cup springs.

Inside cavity 18 of measuring element 10 is connected, via opening (canal) 15 to the inside of housing 2, which is preferably filled with a silicone oil.

Figure 3:
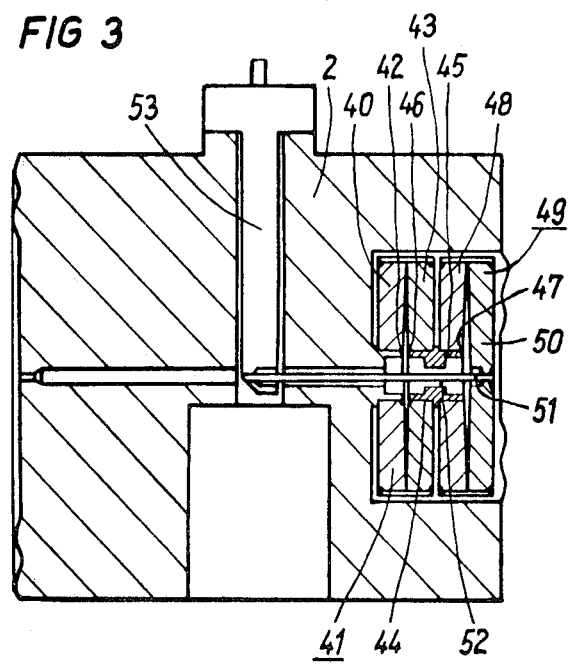
FIG. 3 is an embodiment of the invention showing the use of several measuring elements.

The embodiment of the invention shown in FIG. 3 differs from that of FIGS. 1 and 2 in that, for measuring relatively high pressures, two measuring elements are, so to speak, connected in series. The innermost disc-shaped part 40 of inner measuring element 41 is again welded to housing 2, in the vicinity of its central cutout, at an edge 42, while the outer disc-shaped part 43 of element 41 has a central cutout 44 in which a connecting element 45 is located. Outer disc shaped part 43 is connected at its inner edge 46 as by welding, to connecting element 45. Connecting element 45 is also welded to inner edge 47 of disc-shaped part 48 of a second measuring element 49. The outer, disc-shaped part 50 of measuring element 49 is connected to a transmission element 51 which is brought through hole 52 in connecting member 45 to pickup device 53. The latter can be constructed in the same manner as was described in conjunction with FIGS. 1 and 2. Otherwise, this embodiment does not differ from that of FIGS. 1 and 2.

Figure 4:
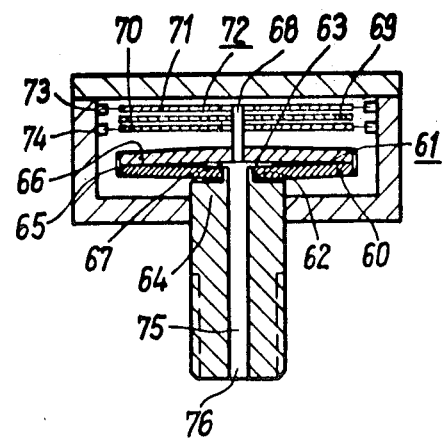
FIG. 4 is a view in a cross section of an embodiment of the invention having an outside-connected transmission element.

In the embodiment of FIG. 4, inner disc-shaped part 60 is again provided with a central cutout 62 and is welded, in the vicinity of this cutout, to an edge 63 of housing 64. Disc-shaped part 60 is connected to the second disc-shaped part 66 by means of a ring 65, in the manner already described. The second disc-shaped part 66 is connected, on the side facing away from inside cavity 67, to transmission element 68, which may be made, for instance, of glass and is sealed into outer disc-shaped part 66. A plate 69 is connected to transmission element 68 and, together with plates 70 and 71, forms a differential capacitor 72. The plates 70 and 71 are fastened to housing 64 via insulating mountings 73 and 74.

Housing 64 has an opening duct or channel 75, which is in communication with inside cavity 67 of measuring element 61. The other end 76 of duct 75 is open to admit the pressure to be measured. In the present case, the positive side of the measuring transducer is therefore connected to the inside of cavity 67, and the outside of the measuring element 61 is connected to the negative side.

It will be apparent to those skilled in he art that transmission element 68 of the embodiment of FIG. 4 need not be used with a pickup device which is designed as a differential capacitor and that other pickup devices can be used which convert a displacement of the transmission element 68 into an electrical quantity with sufficient accuracy.

What is claimed is:

1. In a pressure transducer having a measuring element mounted in a housing and responsive to a pressure to be measured, the measuring element comprising two elastic, disk-shaped parts mounted side-by-side and connected together tightly at their peripheries to form an inside cavity, one of the disk-shaped parts having a central opening by which it is connected to the housing, there being an opening in the housing leading into the inside of the cavity, and the other disk-shaped part being connected to a transmission element, the trasnmission element being centrally attached thereto, the improvement comprising:

a ring mounted on the peripheries of the two disk-shaped parts and firmly joined thereto along the outer edges of the disks which are furthest removed from each other, whereby the disks are tightly and indirectly connected to each other.

2. In a pressure transducer in accordance with claim 1 the further improvement comprising:

the two disk-shaped parts being in the form of cup springs.

3. In a pressure transducer in accordance with claim 1 or claim 2, the further improvement comprising:

the ring being metal and being welded to the disk-shaped parts.

4. In a pressure transducer in accordance with any one of claims 1 to 3, the further improvement comprising:

the transmission element being centrally attached to the other disk-shaped part on the outside of the cavity and connected to a pickup device.

* * * * *